United States Patent [19]
Provino et al.

[11] Patent Number: 5,799,314
[45] Date of Patent: Aug. 25, 1998

[54] SYSTEM AND METHOD OF CONTROLLING MAPPING OF DATA BUFFERS FOR HETEROGENOUS PROGRAMS IN DIGITAL COMPUTER SYSTEM

[75] Inventors: Joseph E. Provino, Cambridge; Mark M. Towfigh, W. Medford, both of Mass.

[73] Assignee: Sun Microsystems, Inc., Palo Alto, Calif.

[21] Appl. No.: 496,982

[22] Filed: Jun. 30, 1995

[51] Int. Cl.$^6$ .................................... G06F 12/08
[52] U.S. Cl. ................. 707/104; 395/872; 711/147
[58] Field of Search ............... 395/701, 200.43, 395/250, 200.44, 200.8, 474, 475, 477, 478, 850, 872, 849; 707/100, 104; 711/147, 153

[56] References Cited

U.S. PATENT DOCUMENTS

| | | | |
|---|---|---|---|
| 4,491,909 | 1/1985 | Shimizu | 711/147 |
| 5,161,215 | 11/1992 | Kouda et al. | 711/119 |
| 5,384,890 | 1/1995 | Anderson et al. | 704/200 |
| 5,434,976 | 7/1995 | Tan et al. | 395/200.64 |
| 5,539,896 | 7/1996 | Lisle | 711/150 |
| 5,564,044 | 10/1996 | Pratt | 395/676 |

FOREIGN PATENT DOCUMENTS 0 522 224 A  1/1993  European Pat. Off. .

OTHER PUBLICATIONS

IBM Technical Disclosure Bulletin, vol. 37, No. 2A, 1 Feb. 1994, p. 351 Copyless and Lockless Data Separation.

*Primary Examiner*—Parshotam S. Lall
*Assistant Examiner*—Viet Vu
*Attorney, Agent, or Firm*—Richard A. Jordan

[57] ABSTRACT

A computer system comprises a plurality of programs, each operating in an operating area such as a virtual machine. The programs are provided with a common data buffer for buffering data for processing by said programs. Each program also has a buffer control including at least one pointer for pointing to a buffer containing data to be processed by the program. One of the programs will initially process the data in the common data buffer and, after it is finished processing, will control the other program's buffer pointer to enable the other program to process the data in the common data buffer. By using the same buffer to contain data to be processed by both programs, the programs can avoid having to copy the data between private buffers maintained for each, which can assist in accelerating through-put by the computer system.

9 Claims, 5 Drawing Sheets

SYSTEM AND METHOD OF CONTROLLING MAPPING OF DATA BUFFERS FOR HETEROGENOUS PROGRAMS IN DIGITAL COMPUTER SYSTEM

FIELD OF THE INVENTION

The invention relates generally to the field of digital data processing systems and more specifically to systems and methods for facilitating maintenance of global information which control certain computer operations in a computer system. In particular, the invention provides an arrangement for use in connection with applications programs operating under, for example, the Microsoft Windows™ operating system, which provides an environment in which a number of applications programs may be contemporaneously executed, for facilitating the maintenance of global information for each applications program.

BACKGROUND OF THE INVENTION

In performing processing operations, computer systems make use of applications programs to perform such operations as database management, word processing, accounting, process control and numerous other functions in an office or industrial environment. The applications programs generally make use of operating system programs both to provide an environment in which they can be conveniently executed and to provide system services such as low-level control of various hardware elements. One popular operating system program, namely, Microsoft Windows™ ("Windows") operates in conjunction with Microsoft's an environment in which applications programs written for Windows can be executed. The Windows operating system program provides, among other things, a graphical user interface ("GUI") as well as a multi-tasking operating environment in which a plurality of Windows programs can be executing contemporaneously.

One problem that arises in connection with processing of programs in the Windows environment arises from the fact that programs may be obtained from a number of diverse program vendors. Since the programs are provided by diverse vendors, data generated by one program normally is copied for use by another program when the other program is to perform subsequent processing operations, which can result in a reduction in computer through-put.

SUMMARY OF THE INVENTION

The invention provides a new and improved arrangement for use in connection with a digital computer system for reducing the copying of data to be processed by a number of programs as executed by the computer system.

In brief summary, the invention provides a computer system which processes a plurality of programs, each operating in an operating area such as a virtual machine. The programs are provided with a common data buffer for buffering data for processing by said programs. Each program also has a buffer control including at least one pointer for pointing to a buffer containing data to be processed by the program. One of the programs will initially process the data in the common data buffer and, after it is finished processing, will control the other program's buffer pointer to enable the other program to process the data in the common data buffer. By using the same buffer to contain data to be processed by both programs, the programs can avoid having to copy the data between private buffers maintained for each, which can assist in accelerating through-put by the computer system.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
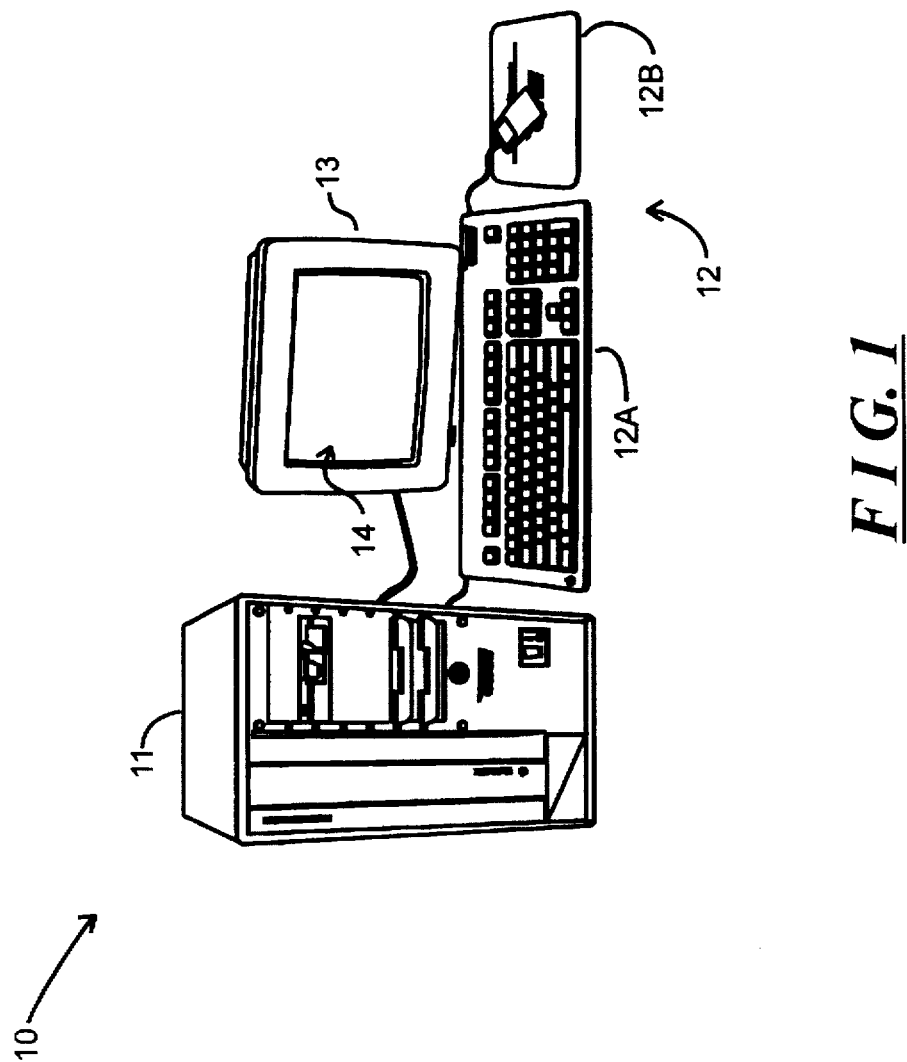
FIG. 1 depicts an illustrative computer system incorporating a context maintenance arrangement in accordance with the invention.

FIG. 1 depicts an illustrative computer system 10 constructed in accordance with the invention. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

The invention will be described in connection with the Microsoft Windows™ operating system program ("Windows"), and further in connection with an arrangement for facilitating transfer of messages over a network including the computer system 10. By way of background, Windows provides an operating environment in which a number of applications programs can be executed contemporaneously in a cooperative, non-preemptive manner, so-called "cooperative multi-tasking," in one or more virtual machines. When an applications program wishes to transfer a block of data over a network, it makes use of network drivers and other network control programs which receive the block of data to be transferred from the applications program, divide the block into packets and transmit the packets as individual messages through a network port (not shown, typically part of the processor module 11) over the network. The number of packets, and thus the number of messages, that are required will depend on the amount of data in the block and the maximum amount of data that can be transmitted over the network in individual messages. Conversely, when the computer system 10 receives a block of data for an applications program, the block is received by the networking control programs as one or more messages. The networking control programs will aggregate the data in the block and, after all of the data has been received, will provide the block to the applications program. If an error occurs during a transfer, the networking control programs or the applications program itself may perform predetermined error recovery operations.

Figure 2:
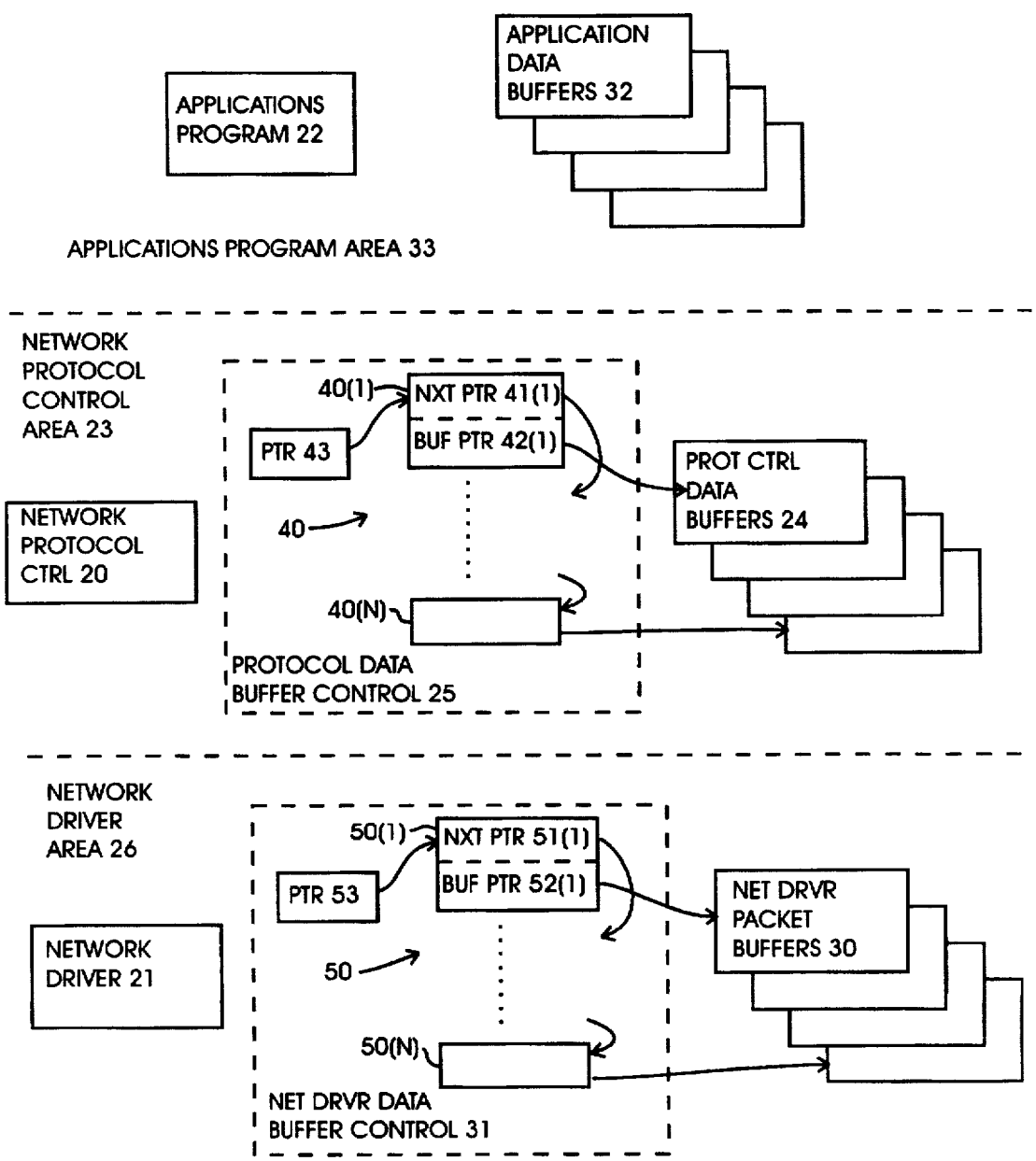
FIGS. 2 and 3 schematically represents a functional block diagram of various structures useful in understanding the invention.

More specifically, and with reference to FIG. 2, the networking control programs include a plurality of programs, including in one embodiment a network protocol control program 20 and a network driver program 21 which may operate in the same or in different virtual machines. Typically, for data to be transmitted, the network protocol control program 20 will perform certain protocol-related functions, including dividing blocks of data received from the applications program 22 into packets and adding addressing and other information, and the network driver program 21 will control the actual transmission. On the other hand, for data being received, the network driver program will receive messages over the network and either it or the network protocol control program 20 will verify that the computer system 10 is the intended recipient. The network protocol control program will also perform protocol-related functions such as determining which of a plurality of applications programs the computer system may be executing is to receive the data and aggregating the data into blocks for provision to the appropriate applications program.

Each of the networking control programs 20 and 21, as well as the applications program 22, operates in what will be identified as an "area," which generally includes the program itself and data structures and buffers which the program uses. In particular, the network protocol control program 20 operates in an area 23 that includes buffers generally identified by reference numeral 24 and buffer control structures 25. Similarly, the network driver program 21 operates in a driver area 26 that includes buffers generally identified by reference numeral 30 and buffer control structures 31. Conventionally, when an applications program 22 wishes to transmit data, the data is copied from the applications program's data buffers 32 in the applications program's area 33 to the network protocol control program's buffers 24 in the network protocol control area 23. The network protocol control program 20 then will process the data to, as described above, divide it into blocks and add the necessary addressing information to form the packets to be transmitted. Thereafter, the packets will be copied to the network driver's packet buffers 30, and the network driver will transmit the packets over the network. Conversely, when an applications program 22 is to receive data, the network driver 21 will receive packets from the network and buffer those for which the computer system 10 is the intended recipient in its buffers 30. The packets will be copied from the network driver's packet buffers 30 to the network protocol control program's buffers 24, where the network protocol control program 20 strips off the addressing information and aggregates the data into blocks for the appropriate applications program 22. After an entire block has been received, the block will be copied to the buffers 32 of the appropriate applications program 22.

Figure 3:
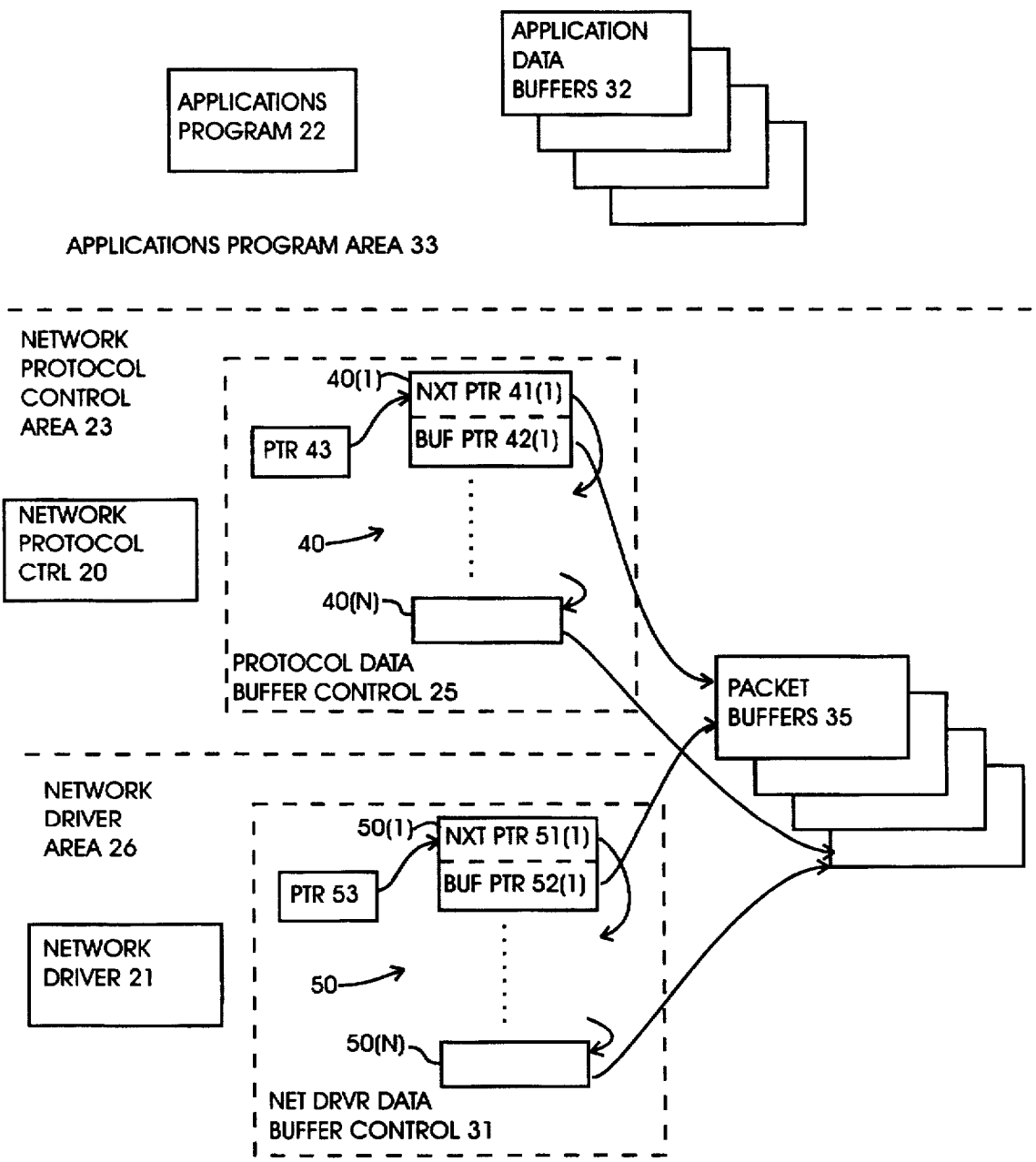

The invention provides an arrangement in which the amount of data for which copying required as between the applications program area 23, network protocol control area 23 and the network driver area 26 is reduced. In the arrangement, which will be described particularly in connection with FIG. 3, the network protocol control program 20 and the network driver program 21 use the same buffers, namely packet buffers 35. With reference to FIG. 3, and as noted above in connection with FIG. 2, each of the network protocol control program 20 and network driver program 21 is provided with a buffer control structure 25 and 31 respectively. The network protocol control program's buffer control structure 25 comprises a linked list 40 comprising a plurality of entries 40(1) through 40(N) (generally identified by reference numeral 40(n)). Each entry includes a plurality of fields, including a next pointer field 41(n) and a buffer pointer field 42(n). The next pointer field 41(n) of each entry 40(n) points to the next entry 40(n+1) in the list 40, so that the fields 41(n) in the series of entries 40(n) will link the entries 40(n) together. A list pointer 43 is provided to point to the first entry 40(1) in the list 40. The buffer pointer field 42(n) in each entry points to one of the packet buffers 35.

Similarly, the network protocol control program's buffer control structure 31 comprises a linked list 50 comprising a plurality of entries 50(1) through 50(N) (generally identified by reference numeral 50(n)). Each entry includes a plurality of fields, including a next pointer field 51(n) and a buffer pointer field 52(n). The next pointer field 51(n) of each entry 50(n) points to the next entry 50(n+1) in the list 50, so that the fields 51(n) in the series of entries 50(n) will link the entries 50(n) together. A list pointer 53 is provided to point to the first entry 50(1) in the list 50. The buffer pointer field 52(n) in each entry points to one of the packet buffers 35.

Figure 4:
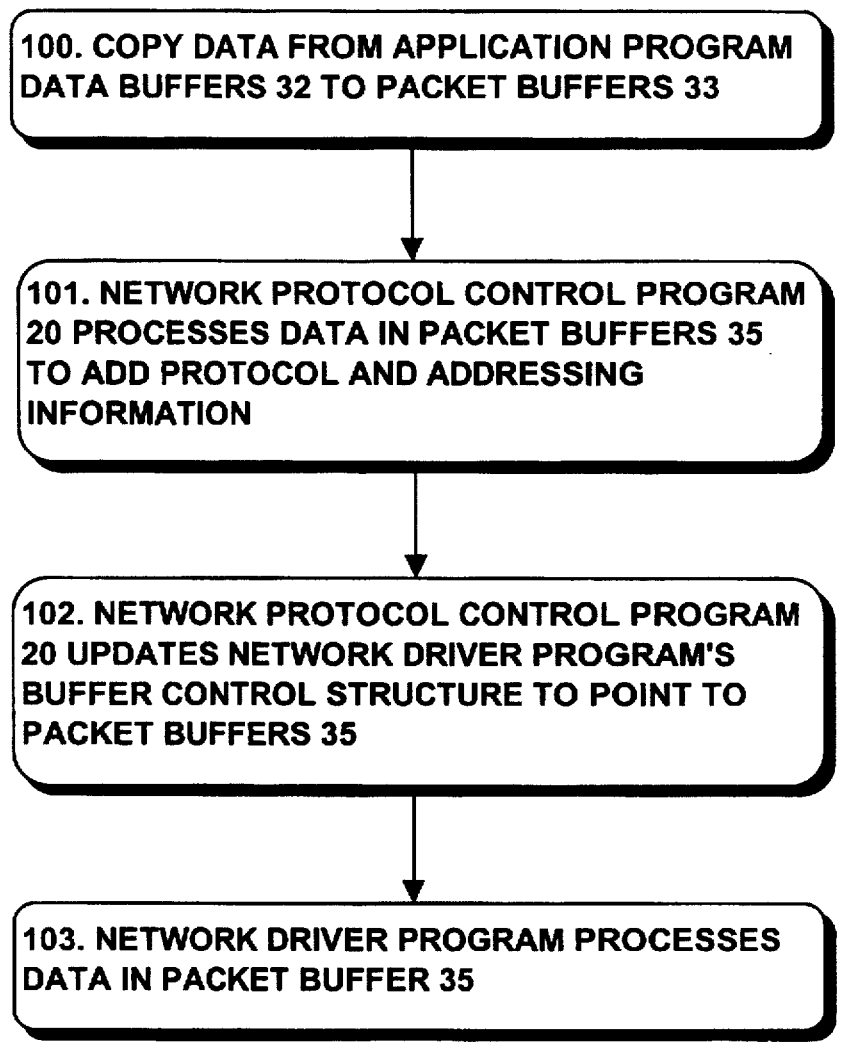
FIGS. 4 and 5 constitute flowcharts depicting the operations performed by the computer system in connection with the invention.

In accordance with the invention, and as described in the flowchart in FIG. 4, for transmission of data from the computer system 10 over the network, the data to be transmitted will initially be copied from the applications program's data buffers 32 to the packet buffers 35 (step 100). The network protocol control program 20 will thereafter process the data to add the protocol and addressing information (step 101). After processing a block of data to be transmitted in the packet buffers 35, the network protocol control program 20 instead of copying the packets from buffers 35 to a set of private buffers (such as buffers 30, FIG. 2) for the network driver program 21, will copy the contents of the various fields of the linked list 40 into the linked list 50 of the network driver program's buffer control structure 31 (step 102). Thereafter, the network driver program 21 will enable transmission of the packets from the packet buffer 35 over the network (step 103).

Figure 5:
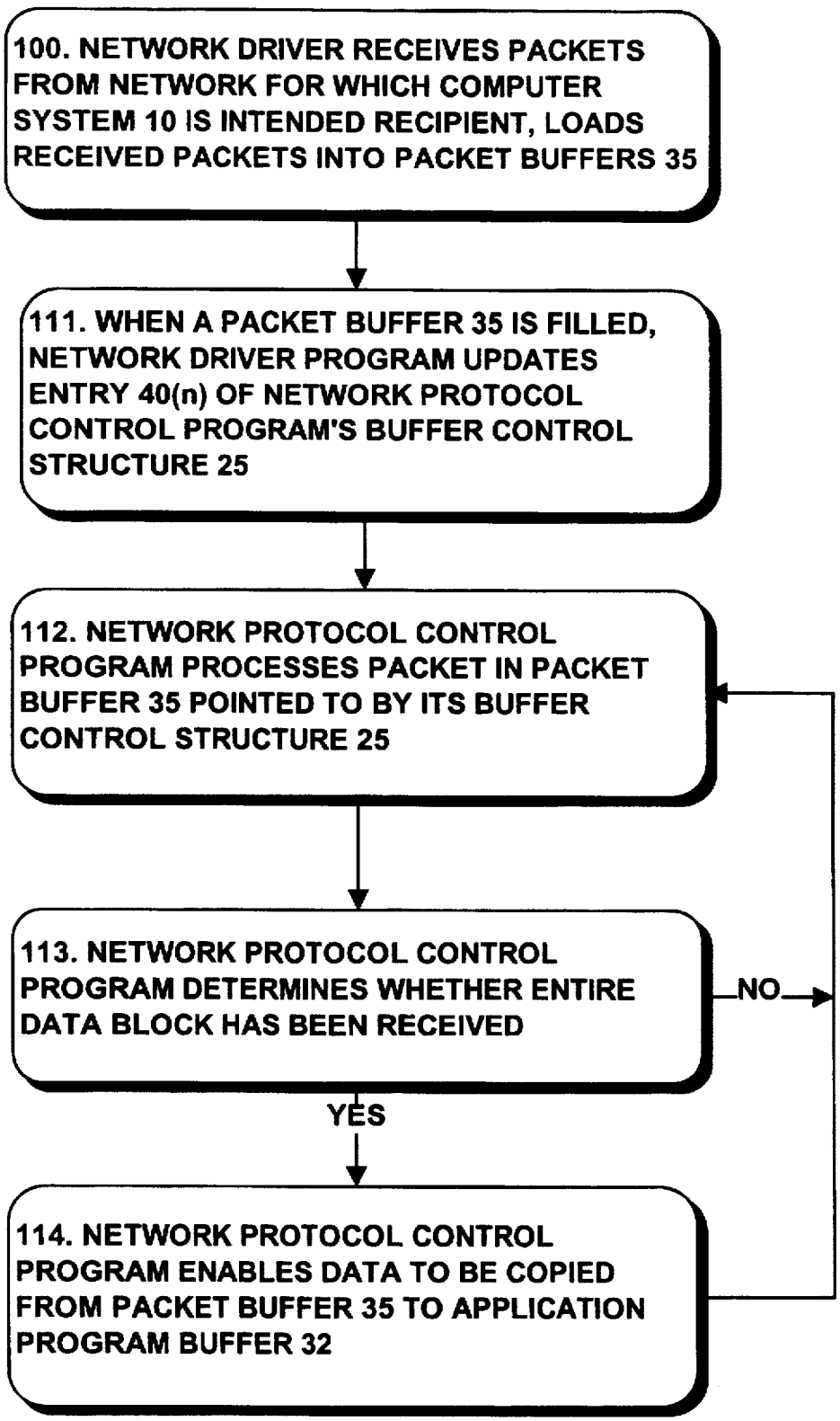

Conversely, for reception of data from the network, as described in the flowchart in FIG. 5, when receiving packets the network driver program 21 will receive packets for which the computer system 10 is the intended recipient (step 110) and load them into the packet buffers 35. When a packet buffer is filled, the network driver program 21 will update the next entry 40(n) of the network protocol control program's buffer control structure 25 to point to the buffer (step 111). The network protocol control program 20 will process the packet in the buffer to strip the protocol information (step 112) and determine whether the packet is the last for a block being received for an applications program 22 (step 113). If the network protocol control program 20 makes a negative determination in step 113, it will return to step 112 to process the next packet. In that operation, it will be appreciated that the network protocol control program 20 may need to wait for the network driver program 21 to provide it with a next entry 40(n+1) for its buffer control structure 25, since the network driver program 21 may not have received a packet and loaded it into the packet buffers 35 before it (the network packet control program 20) finishes processing of the packet identified by entry 40(n). On the other hand, if the network protocol control program 20 makes a positive determination in step 113, it will have received and processed data for a complete block for an applications program 22, and so it will enable the data to be copied from the packet buffers 35 to the applications program's data buffers 32 for processing by the applications program (step 114). Following step 114, the network protocol control program will return to step 112 to process the next packet it receive from the network driver program; it will be appreciated that the next packet will relate to a different block than the block that was passed to the applications program buffer 32 in step 114.

The invention provides a number of advantages. In particular, it facilitates a reduction in the amount of copying of data required as among diverse programs in a computer system 10 which can significantly increase system throughput if large amounts of data are required. By enabling the programs to use the same buffers, the amount of copying required will clearly be reduced.

While the invention has been described in connection with programs operating in a networking environment, in particular using a network protocol control program 20 and a network driver program 21 operating in the Windows environment, it will be appreciated that the invention will find utility in connection with programs operating in any environment in which data is normally copied for separate processing by the programs. In addition, while the invention has been described in connection with linked lists 40 and 50 as buffer pointers, it will be appreciated that other structures may be used to identify the data to be processed by the various programs.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer system comprising a plurality of programs each operating in an operational area and a plurality of common data buffers each for buffering data, each program having a buffer control including at least one buffer pointer, each buffer pointer pointing to one of said common data buffers containing data to be processed by the one of said programs associated therewith, one of said programs, after processing the data in one of said common data buffers, thereafter updating another of said programs' buffer pointers to add a buffer pointer pointing to the one of said common data buffers thereby to facilitate processing of the data in the one of said common data buffers by said other of said programs, in which:
   A. said one of said programs comprises a network protocol control program for receiving data from an application program to be transferred over a network and dividing the received data into one or more blocks each for transmission in a packet over the network, said network protocol control program loading each block of data into an associated one of common data buffers,
   B. said other of said programs comprises a network driver program which enables each block to be transmitted over said network in an associated packet; and
   C. said network protocol control program, after loading each respective one of said blocks of data into one of said common data buffers, updating the buffer pointers associated with said network driver program to add a buffer pointer thereto pointing to the one of said common data buffers, the network driver program using its buffer pointers to identify each common data buffer containing data for which it is to generate a said packet for transmission over the network.

2. A computer program product including a computer-readable medium having encoded thereon code devices associated with a program, the code devices enabling the computer system to perform operations in an operational area and in connection with respective ones of a plurality of common data buffers each for buffering data, said computer program product enabling the computer system to establish a buffer control including at least one buffer pointer, each buffer pointer pointing to one of said common data buffers containing data to be processed, said program, after enabling the computer system to process the data in one of said common data buffers, enabling the computer system to update another program's buffer pointers to add a buffer pointer pointing to the one of said common data buffers thereby to facilitate processing of the data in the one of said common data buffers by said computer system under control of said other program, in which:
   A. said one of said programs comprises a network protocol control program for enabling said computer system to receive data from an application program to be transferred over a network and divide the received data into one or more blocks each for transmission in a packet over the network, said network protocol control program enabling said computer system to load each block of data into an associated one of common data buffers,
   B. said other of said programs comprises a network driver program which enables said computer system to transmit each block over said network in an associated packet; and
   C. said network protocol control program, after enabling said computer system to load each respective one of said blocks of data into one of said common data buffers, enables said computer system to update the buffer pointers associated with said network driver program to add a buffer pointer thereto pointing to the one of said common data buffers, the network driver program enabling said computer system to use its buffer pointers to identify each common data buffer containing data for which it is to generate a said packet for transmission over the network.

3. A method of controlling a computer system in response to a program, comprising the steps of
   A. enabling the computer system to perform operations in connection with the program in an operational area and in connection with one of a plurality of common data buffers each for buffering data, said program enabling the computer system to establish a buffer control including at least one buffer pointer, each for pointing to one of said common data buffers containing data to be processed thereby, and
   B. after processing of data in a respective one of said common data buffers, updating another programs' buffer pointers to add a buffer pointer pointing to the one of said common data buffers thereby to facilitate processing of the data in the one of said common data buffers by said other of said programs,
   in which:
      i. said one of said programs comprises a network protocol control program for enabling said computer system to receive data from an application program to be transferred over a network and divide the received data into one or more blocks each for transmission in a packet over the network, said network protocol control program enabling said computer system to load each block of data into an associated one of common data buffers, ii. said other of said programs comprises a network driver program which enables said computer system to transmit each block over said network in an associated packet; and iii. said network protocol control program, after enabling said computer system to load each respective one of said blocks of data into one of said common data buffers, enables said computer system to update the buffer pointers associated with said network driver program to add a buffer pointer thereto pointing to the one of said common data buffers, the network driver program enabling said computer system to use its buffer pointers to identify each common data buffer containing data for which it is to generate a said packet for transmission over the network.

4. A method as defined in claim 3 in which the buffer control comprises a linked list configured to include a series of entries, each entry having a buffer pointer field for receiving a buffer pointer, said program, after processing the data in said one of said common data buffers, adding to the linked list associated with said other program a said entry including in the buffer pointer field a pointer to the one of said common data buffers.

5. A method as defined in claim 4 in which each entry further includes a next entry pointer field for pointing to a next entry in the series of entries.

6. A computer program product as defined in claim 2 in which the buffer control comprises a linked list configured to include a series of entries, each entry having a buffer pointer field for receiving a buffer pointer, said code devices associated with said program, after enabling the computer system to process the data in said one of said common data buffers, enabling said computer system to add to the linked list associated with said other program a said entry including in the buffer pointer field a pointer to the one of said common data buffers.

7. A computer program product as defined in claim 6 in which each entry further includes a next entry pointer field for pointing to a next entry in the series of entries.

8. A computer system as defined in claim 1 in which each buffer control comprises a linked list configured to include a series of entries, each entry having a buffer pointer field for receiving a buffer pointer, said one of said programs, after processing the data in said one of said common data buffers, adding to the linked list associated with said other of said programs a said entry including in the buffer pointer field a pointer to the one of said common data buffers.

9. A computer system as defined in claim 8 in which each entry further includes a next entry pointer field for pointing to a next entry in the series of entries.

* * * * *